United States Patent [19]

Yamada

[11] Patent Number: 5,032,711
[45] Date of Patent: Jul. 16, 1991

[54] AUTOMOTIVE METER
[75] Inventor: Hiroshi Yamada, Shimada, Japan
[73] Assignee: Yazaki Corporation, Tokyo, Japan
[21] Appl. No.: 553,843
[22] Filed: Jul. 18, 1990
[30] Foreign Application Priority Data
  Jul. 27, 1989 [JP] Japan .............................. 1-87408[U]
[51] Int. Cl.⁵ .............................................. G09F 13/20
[52] U.S. Cl. .................................. 250/461.1; 40/543; 368/226
[58] Field of Search ............... 250/461.1, 462.1, 463.1; 50/543, 544; 116/334, 335; 368/226

[56] References Cited
U.S. PATENT DOCUMENTS

| | | | |
|---|---|---|---|
| 2,459,694 | 1/1949 | Gordon | 368/226 |
| 2,689,917 | 9/1954 | Switzer | 40/543 |
| 4,536,656 | 8/1985 | Sowa | 40/543 |
| 4,841,155 | 6/1989 | Ushida et al. | 250/462.1 |
| 4,875,433 | 10/1989 | Tsukamoto | 116/334 |
| 4,970,400 | 11/1990 | Muramatsu | 250/461.1 |

Primary Examiner—Carolyn E. Fields
Assistant Examiner—Drew A. Dunn
Attorney, Agent, or Firm—Armstrong, Nikaido, Marmelstein, Kubovcik & Murray

[57] ABSTRACT

An automotive meter comprising a meter case, a dial plate fixedly disposed within the meter case, indicating needles provided in front of the dial plate, meter units respectively for driving the indicating needles according to measured values, and an ultraviolet lamp for irradiating the front surface of the dial plate by ultraviolet rays. The dial plate is formed by printing a grid layer on the backside of a transparent base plate with an ultraviolet ink, printing a ground layer on the grid layer with an ultraviolet ink, and printing dial patterns including graduations and characters on the front surface of the base plate with an ultravviolet ink. When the dial plate is irradiated by ultraviolet rays emitted by the ultraviolet lamp in the nighttime, the shadows of the dial patterns are cast on the interface between the base plate and the grid layer, the grid layer and the ground layer become luminous in similar colors and the dial patterns become luminous in a color different from those of the grid layer and the ground layer. The shadows of the dial patterns emphasizes the appearance of tridimensionality of the dial patterns.

3 Claims, 2 Drawing Sheets

AUTOMOTIVE METER

BACKGROUND OF THE INVENTION

1. Field of the Invention

The present invention relates to an automotive meter and, more specifically, an automotive meter, such as a speed meter, mounted on the instrument panel of an automobile.

2. Description of the Prior Art

Automotive meters including a speed meter for indicating the running speed of the automobile are mounted on the instrument panel of the automobile. FIG. 4 shows such a conventional automotive meter comprising a meter case 1 having an upper wall projecting to the front, a graduated dial plate 2 fastened to the inner surface of the meter case, meter unit 3 fixedly disposed behind the dial plate 2, indicating needles 4 which are driven respectively by the meter units 3 according to measured values to indicate the measured values on the dial plate 2, an ultraviolet lamp (hereinafter referred to as "UV lamp") 5 disposed in front of the dial plate 2 at a position corresponding to the upper part of the dial plate 2 to irradiate the graduated surface of the dial plate 2 by ultraviolet rays (hereinafter referred to as "UV rays"), and a meter pane 6 attached to the front end of the meter case 1 at an inclination. As shown in FIGS. 5 and 6, the dial plate 2 is formed by coating the front surface of a base plate 7 by printing a ground layer 8 with an UV ink prepared by mixing a substantially transparent fluorescent pigment and a colored ink, printing a halftone layer 9 over the ground layer 8, and printing dial patterns 10 including graduations and characters on the halftone layer 9 with an ink of a bright color such as a white ink.

In the daytime, the ground layer 8 makes the front surface of the dial plate 2 look dark, for example, gray, and the dial patterns 10 including graduations and characters look white in the daylight. In the nighttime, the ground layer 8 of the UV ink becomes luminous in, for example, green, when irradiated by UV rays emitted by the UV lamp 5 and the dial pattern 10 look white. The dot density of the halftone layer 9 in the central regions of the dial patterns 10 higher than that in regions surrounding the dial patterns 10 as shown in FIG. 5, makes the dial plate 2 look convex toward the front and gives the dial plate 2 the appearance of tridimensionality.

The effect of such a distribution of dot density on giving the dial plate 2 the appearance of tridimensionality, however, is insufficient and is unable to give effectively the dial patterns 10 of the dial plate 2 the appearance of tridimensionality.

SUMMARY OF THE INVENTION

Accordingly, it is an object of the present invention to provide an automotive meter having a dial plate having dial patterns including graduations and characters having the appearance of high tridimensionality.

In one aspect of the present invention, an automotive meter comprises a meter case, a dial plate formed by printing dial patterns including graduations and characters on the surface of a base plate and fixedly provided in the meter case, indicating needles provided in front of the dial plate, meter units respectively for driving the indicating needles, and an ultraviolet lamp disposed in front of the dial plate to irradiate the surface of the dial plate by UV rays, and is characterized in that the dial patterns are printed with an UV ink, and the backside of the base plate of the dial plate is coated with a ground layer of an UV ink by printing or application.

In another aspect of the present invention, a grid pattern is printed with a UV ink on the backside of the base plate of the dial plate, and a ground layer is printed over the grid pattern of the UV ink with an UV ink of the same hue as that of the UV ink forming the grid pattern.

Thus, the colors of the ground layer printed with the UV ink and the dial pattern printed with the UV ink change when irradiated by ultraviolet rays, and the shadows of the dial patterns are cast on the interface between the base plate and the ground layer to inhibit color change in regions of the ground layer shaded by the shadows of the dial patterns, so that the colors of the ground layer, the dial patterns and the shadows change stepwise in the vicinitY of the contours of the dial patterns to make the dial patterns look like having a thickness corresponding to the thickness of the base plate and to give the dial patterns the appearance of satisfactory tridimensionality. The grid pattern formed between the backside of the base plate and the ground layer enhances the effect of the shadows to emphasize the apparent thickness of the dial patterns.

BRIEF DESCRIPTION OF THE DRAWINGS

The above and other objects, features and advantages of the present invention will become more apparent from the following description taken in connection with the accompanying drawings in which.

DETAILED DESCRIPTION OF THE PREFERRED EMBODIMENT

Figure 1:
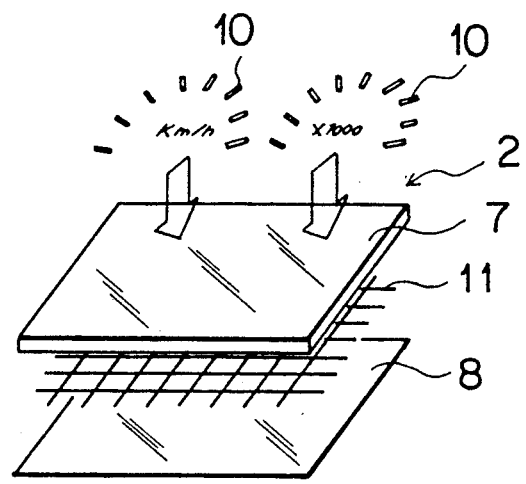
FIG. 1 is an exploded perspective view of a dial plate employed in an automotive meter in a preferred embodiment according to the present invention.

FIG. 1 shows a dial plate 2 employed in an automotive meter in a preferred embodiment according to the present invention. The dial plate 2 is formed by printing a grid layer 11 on the backside of a transparent base plate 7 formed of a synthetic resin or the like with an UV ink prepared by mixing a substantially transparent fluorescent pigment and an ink of a desired color, printing a ground layer 8 on the grid layer 11 with an UV ink of the same hue as that of the UV ink forming the grid layer 11, and printing predetermined dial patterns 10 including graduations and characters on the front surface of the base plate 7 with an UV ink prepared by mixing a fluorescent pigment and a white ink.

In the daytime, the ground layer 8, hence the base plate 7, looks, for example, gray and the dial patterns 10 look white in the sunshine. In the nighttime, the surface of the dial plate 2 is irradiated by UV rays emitted by an UV lamp, not shown. Then, the ground layer 8 and the grid layer 11 look, for example, blue, and the dial patterns 10 look, for example, yellowish green.

Figure 2:
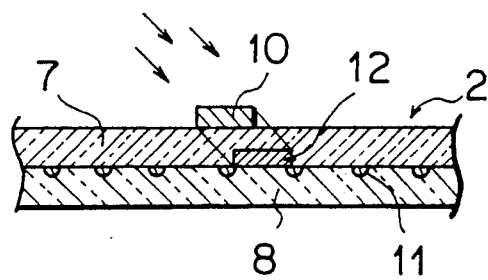
FIG. 2 is a sectional view of the dial plate of FIG. 1.
Figure 3:
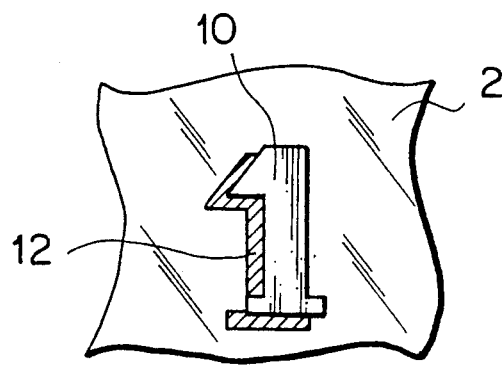
FIG. 3 is a front view of a character printed on the dial plate of FIG. 1.
Figure 4:
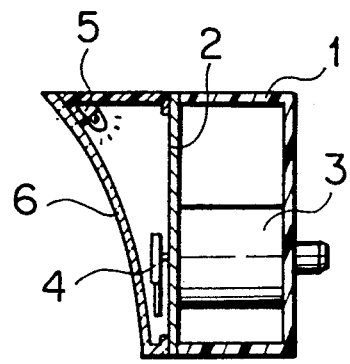
FIG. 4 is a sectional view of a conventional automotive meter.
Figure 5:
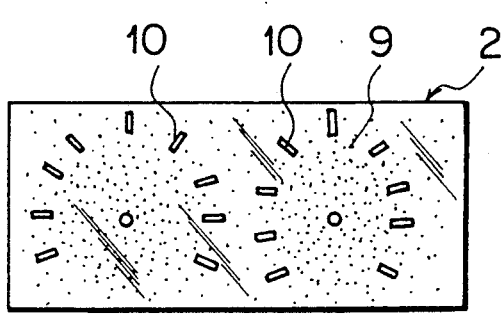
FIG. 5 is a front view of a conventional dial plate.
Figure 6:
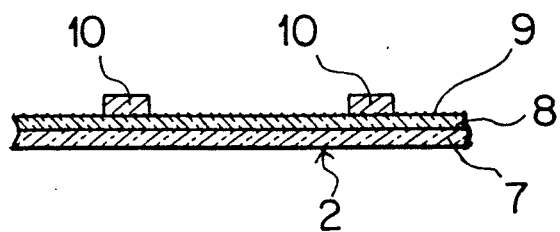
FIG. 6 is a fragmentary sectional view of the dial plate of FIG. 5.

As shown in FIG. 2, shadows 12 of the dial patterns 10 are cast through the base plate 7 on the interface between the base plate 7 and the grid layer 11, and hence regions of the grid layer 11 and those of the ground layer 8 shaded by the shadows 12 are not exposed to the UV rays. Therefore, the color of the regions shaded by the shadows 12 remains unchanged and the shadows 12, hence the shaded regions look gray. Thus, the ground layer 8 and the grid layer 11 look blue, the dial patterns 10 look yellowish green and the shadows 12 look gray and, consequently, the colors of regions around the contours of the dial patterns 10 change stepwise. The shadow 12 of a character cast on the interface between the base plate 7 and the grid layer 11 and partially overlapping the character as shown in FIG. 3 gives an apparent thickness corresponding to the thickness of the base plate 7 to the character. Such an effect of the shadows 12 gives the dial patterns 10 the appearance of tridimensionality. The shadows 12 are contrasted by the grid layer 11, whereby the effect of the shadows 12 on the appearance of tridimensionality is emphasized. Thus, the shadows 12 cast on the interface between the base plate 7 and the grid layer 11 give the dial patterns 10 the appearance of tridimensionality very effectively.

Although the grid layer 11 is formed all over the backside of the base plate 7 between the base plate 7 and the ground layer 8 in this embodiment, the grid layer 11 may be formed in a pattern corresponding to the shadows 12. Although the clearness of the shadows 12 diminishes, the appearance of tridimensionality can be given to the dial patterns even if the grid layer 11 is omitted.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. An automotive meter comprising: a meter case; a dial plate fixedly disposed within the meter case; indicating needles provided in front of the dial plate; meter units respectively for driving the indicating needles according to measured values; and an ultraviolet lamp provided within the meter case to irradiate the front surface of the dial plate by ultraviolet rays; characterized in that the dial plate is formed by printing a ground layer on the backside of a base plate with an ink which fluoresces in response to ultraviolet rays, and printing dial patterns on the front surface of the base plate with an ink which fluoresces in response to ultraviolet rays.

2. An automotive meter comprising: a meter case; a dial plate fixedly disposed within the meter case; indicating needles provided in front of the dial plate; meter units respectively for driving the indicating needles according to measured values; and an ultraviolet lamp provided within the meter case to irradiate the front surface of the dial plate by ultraviolet rays; characterized in that the dial plate is formed by printing a grid layer on the backside of a base plate with an ink which fluoresces in response to ultraviolet rays, printing a ground layer on the grid layer with an ink which fluoresces in response to ultraviolet rays, and printing dial patterns on the front surface of the base plate with an ink which fluoresces in response to ultraviolet rays.

3. An automotive meter according to claim 2, wherein the ink which fluoresces in response to ultraviolet rays forming the grid layer and the ink which fluoresces in response to ultraviolet rays forming the ground layer are of the same hue when not irradiated.

* * * * *